Dec. 24, 1940. T. R. DAYKIN Re. 21,678
PAPER CABINET
Original Filed May 23, 1936
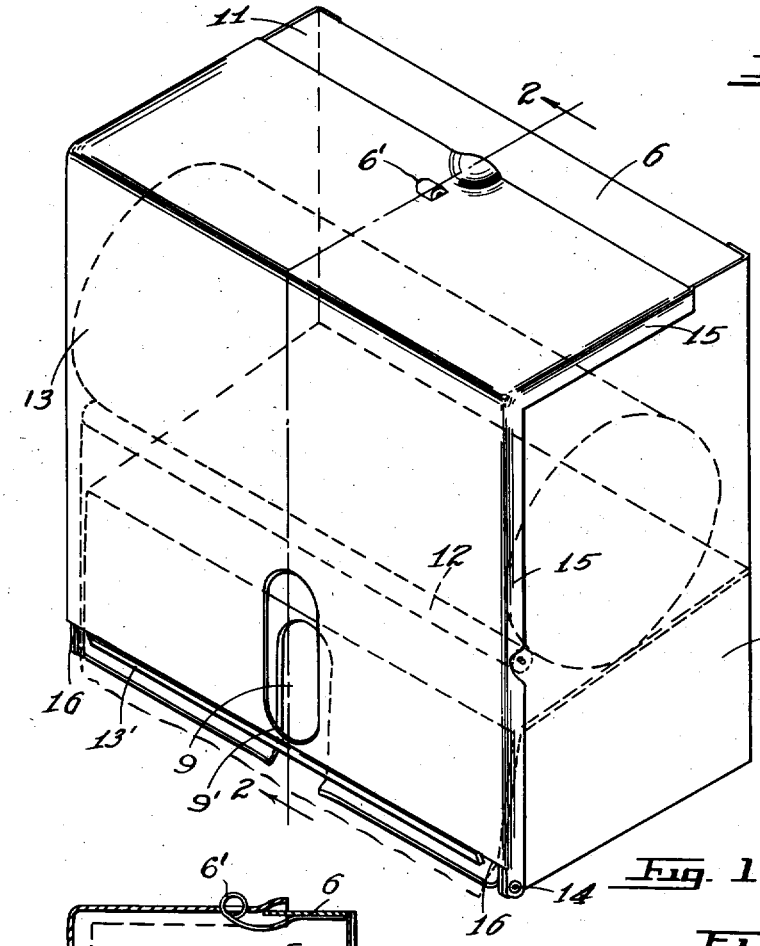
Fig. 1.
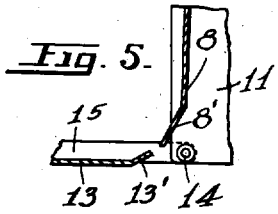
Fig. 5.
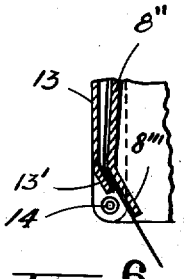
Fig. 6.
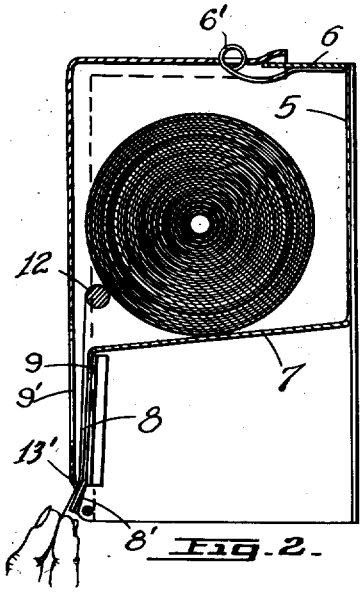
Fig. 2.
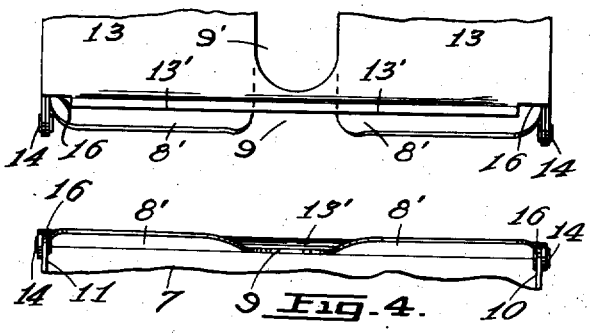
Fig. 3.
Fig. 4.
INVENTOR,
Thomas R. Daykin.
By David W. Gould
ATTORNEY Reissued Dec. 24, 1940

Re. 21,678

UNITED STATES PATENT OFFICE 21,678

PAPER CABINET

Thomas Reginald Daykin, Outremont, Quebec, Canada, assignor to Hygiene Products Limited, Montreal, Quebec, Canada, a corporation of Canada Original No. 2,110,827, dated March 8, 1938, Serial No. 81,531, May 23, 1936. Application for reissue September 22, 1939, Serial No. 296,163. In Canada August 14, 1935

19 Claims. (Cl. 242—55.5)

This invention relates to a paper cabinet and the principal object is to provide a combination container and dispenser for paper or other materials which are used from a roll.

A further object is to provide a cabinet of this nature having a special means for permitting engagement of the paper between the thumb and index finger and tearing the desired quantity as required.

A further object is to provide a roller retaining member for holding the roll of paper from contacting with the front or cover portion of the cabinet.

With the foregoing and other objects in view, as will appear as the description proceeds, the invention consists of the novel construction, combination and arrangement of co-operating elements as hereinafter more specifically set forth, claimed and shown in the accompanying drawing forming a part of the present application, in which:

Figure 1 is a perspective view of the preferred embodiment of my invention, the roll of paper and protruding end thereof being shown in dotted lines.

Figure 2 is a transverse sectional view being taken on the lines 2—2 of Figure 1.

Figures 3 and 4 are a front fragmentary plan and a bottom view of the paper exit opening, showing the shearing or cutting member upon which the paper or the like is torn.

Figure 5 is a fragmentary sectional view, illustrating the open position of the cover.

Figure 6 is a fragmentary vertical cross section indicating an alternative form of paper exit.

Like numerals of reference designate corresponding parts throughout the different views.

The body portion of the cabinet or container consists of a back 5, with a laterally-inwardly bent top 6 and a laterally-inwardly bent bottom 7. The bottom 7 is inclined downwardly from the back 5. The body portion of the cabinet extends downwardly from the bottom 7 to provide integral therewith a front or apron 8. This front 8 is provided with a finger notch 9 formed upwardly from the bottom and preferably centrally thereof. The bottom edge of the front 8 has its greater portion bent out slightly to form a lip as at 8′, the corners adjacent the notch 9 being flattened more in parallel relationship to the front 8 than the respective main portions of this edge 8′ so as to avoid creasing of the paper as it is pulled initially in a downward direction between the edge 8′ and edge 13′. 10 and 11 are the opposite end members suitably brazed or otherwise attached to the respective ends of the body portion.

Supported longitudinally parallel with the bottom 7 and adjacent the front edge thereof, I provide paper-positioning means raised above the base of the roll, as for instance a roller 12, preferably supported in the ends 10 and 11.

13 is a cover of inverted L-shaped formation having vertical and horizontal panels closing the container. The bottom of the cover is pivotally mounted by the pivots 14 to the lower front corners of the respective ends 10 and 11. This cover has a flanged edge 15 extending over the front edges of the ends 10 and 11 of the cabinet. The top 6 may be provided with any desired gripping means and locking means, the latter to operate in association with an opening or engagement means to provide catch and locking facilities between the cover and body portion of the cabinet. I have shown one means, as illustrated at 6′, but any desired means may be used for providing gripping engagement or locking means for this purpose.

The lower front edge 13′ of the cover 13 forms a tearing or cutting edge and is bent inwardly towards the lower edge of the front 8 and forms a cutting edge cooperating with the outwardly bent portion or lip 8′ in limiting the transverse movement of the free end of the paper. The opposite ends of this edge 13′ are notched as at 16 to provide a pointed portion which will facilitate tearing of the sheet of paper on the cutting edge 13′. The front portion of the cover 13 is provided with a finger opening 9′ in registered relationship with the finger notch 9. The paper will be fed down between the front 8 and the cover 13, these elements thus forming a dispensing chute to retain the paper in position for grasping. In the position, as shown in Figure 1, the thumb and index finger may be inserted through the opening 9′ and finger notch 9 to permit engagement of the end of the paper or other like material and pull the same down, after which any desired portion of the roll may be torn off along the cutting edge 13′. Preferably, the edges 8′ are slightly below the tearing edge 13′, as illustrated in the drawing, for the purpose of guiding the paper adjacent the tearing edge and the pointed portions thereof provided by the notches 16.

The forward inclination of the bottom 7 keeps the roll of paper or the like material in a position adjacent the front of the container space and in contact with the roller 12 as the paper is used up and the roll becomes smaller.

When the paper is being withdrawn, the weight of the roll and the circuitous path of the paper sets up a tension in the paper causing it to assume a straight line between the roller 12 and the edge of the lip 13', as is clear from the drawing.

The lip 8' insures contact of the paper with the tearing edge 13', and sets up additional tension in the paper outside the chute. This arrangement prevents accidental tearing of the paper above the tearing edge 13'. When the paper is released the walls of the chute prevent it from curling out of reach.

As shown in Figure 5, the flanged side edges 15 extend below the lower edge of the cover 13, so that when the cover is in open position the edge 13' is offset from the edge 8' and the free end of the paper may be easily inserted between the edges 8' and 13'.

The foregoing specification and annexed drawing disclose the preferred embodiment of my invention, but it is to be understood that minor changes may be resorted to in the commercial adaptation of my invention without departing from the scope of the invention as hereinafter claimed.

In certain cases it may be desirable to have the front 8' and the edge 13' bent backwardly as illustrated at 8''' and 13'' in Figure 6. As noted in Figure 6, the front portion 8''' and edge 13'' are bent backwardly at a slight angle in a direction as would be toward the wall to which the cabinet would be attached.

I claim:

1. A cabinet for holding and dispensing rolled paper embodying a body portion consisting of a back, top, bottom and front, said bottom being inclined downwardly from said back, end members carried by said body portion, a cover for closing the container compartment of said cabinet, said front and said cover forming a dispensing chute for the free end of said paper, and said front and said cover being provided with oppositely registering finger openings and the discharge edges of said front and said cover being bent towards each other, the portions of said front adjacent the finger opening therein being bent less than the remaining portion of said front.

2. A cabinet for holding and dispensing rolled paper embodying a body portion consisting of a back, a laterally supported upper portion forming a top, a laterally supported and downwardly inclined portion forming a bottom, a front extending down from the forward end of said bottom, end members carried by said back, top, bottom and front, a cover for closing the container compartment of said cabinet, said front and said cover forming a dispensing chute for the free end of said paper, said front and said cover being provided with oppositely registering finger openings and the discharge edges of said front and said cover being bent towards each other, the portions of said front adjacent the finger opening therein being bent less than the remaining portion of said front.

3. A cabinet for holding and dispensing rolled paper, embodying a body portion consisting of a back, top, bottom and front, said bottom being inclined downwardly from said back, end members carried by said body portion, a cover for closing the container compartment of said cabinet, a pivotal connection between said end members and the lower edge of said cover to provide offsetting of said cover from said front when said cover is in open position, said front and said cover forming a dispensing chute for the free end of said paper when said cover is in closed position, said front and said cover being provided with oppositely registering finger openings and the discharge edges of said front and said cover being bent towards each other, the portions of said front adjacent the finger opening therein being bent less than the remaining portion of said front.

4. A cabinet for holding and dispensing paper comprising a cover portion hingedly supported by two end portions, a bottom portion supporting said paper roll and extending substantially parallel to said cover portion at its lower part, the front of said bottom portion extending below the edge of said cover portion to serve as a guide when withdrawing the paper, the lower edge of said cover portion being bent inward toward the edge of the front portion of the bottom and serving as a cutting edge.

5. A cabinet for holding and dispensing rolled paper embodying a body portion consisting of a back, top, bottom and front, said bottom being inclined downwardly from said back, end members carried by said body portion, a panel for closing the container compartment of said cabinet, said front and said panel forming a dispensing chute for the free end of said paper, and said front and said panel being provided with oppositely registering finger openings and the discharge edges of said front and said panel being bent towards each other, the portions of said front adjacent the finger opening therein being bent less than the remaining portion of said front.

6. A cabinet for holding and dispensing rolled paper embodying a body portion consisting of a back, a laterally supported upper portion forming a top, a laterally supported and downwardly inclined portion forming a bottom, a front extending down from the forward end of said bottom, end members carried by said back, top, bottom and front, a panel for closing the container compartment of said cabinet, said front and said panel forming a dispensing chute for the free end of said paper, said front and said panel being provided with oppositely registering finger openings and the discharge edges of said front and said panel being bent towards each other, the portions of said front adjacent the finger opening therein being bent less than the remaining portion of said front.

7. A paper dispenser comprising in combination a container having a bottom adapted to support a roll of paper loosely resting thereon, paper positioning means above the forward portion of the bottom, the bottom being sloped to urge the roll against the paper positioning means, a continuation of the bottom forming a downwardly extending apron, a front panel closing the front of the container and having a portion lying adjacent and substantially parallel to the apron, the panel and the apron forming a dispensing chute, the panel and the apron having edges adjacent the mouth of the chute, the panel having an opening spaced from the edge, the apron having a notch extending from the edge to register with the opening, the opening and the notch providing finger access to the end of the paper, the edge of the panel having a lip inbent toward the apron and forming a tearing edge, the edge being narrower than the mouth of the chute and terminating at each end in a point adapted to make an initial incision in the paper, the edge of the apron projecting across the mouth of the chute and overlapping the tearing edge so as to guide adjacent the tearing edge the paper being withdrawn, the projection of the edge of the apron being less pronounced adjacent the notch to facilitate the initial withdrawal of the paper, the notch providing finger access for drawing the paper past the tearing edge.

8. A paper dispenser as claimed in claim 7 wherein the front panel is provided with laterally positioned downward projections, said projections being pivotally connected to said container for outward pivotal opening whereby the tearing edge is offset from the edge of the apron.

9. A paper dispenser comprising in combination, a container having a bottom adapted to support a roll of paper, a continuation of the bottom forming a downwardly extending apron, a front panel closing the front of the container and having a portion lying adjacent the apron to form a dispensing chute, and registering finger openings in the panel and the apron for grasping the end of the paper, the front panel being provided adjacent the mouth of the chute with a tearing edge, and the apron being provided with a lip projecting across the mouth of the chute and overlapping the tearing edge so as to guide adjacent the tearing edge the paper being withdrawn.

10. A paper dispenser comprising a container adapted to receive a roll of paper, the container having a sloping bottom adapted to urge the roll towards the front of the container, paper positioning means adapted to position the roll on the bottom, a pair of substantially parallel outer and inner walls forming a dispensing chute leading from the container, registering openings in the walls permitting finger access to the free end of the paper, the outer wall having adjacent the mouth of the chute a tearing edge, and the inner wall having an edge projecting across the mouth of the chute and overlapping the tearing edge to cause frictional engagement between the paper being withdrawn and the tearing edge, whereby the paper being withdrawn is subjected to increased tension after passing the tearing edge.

11. A paper dispenser as claimed in claim 10 wherein the opening in the outer wall is spaced from the tearing edge, the opening in the inner wall is in the form of a notch extending from the overlapping edge to register with the opening in the outer wall, the outer-wall opening and the notch providing finger access for grasping the end of the paper, the notch being adapted to permit continuous finger contact with the paper for initial withdrawal past the tearing edge.

12. A paper dispenser as claimed in claim 10 wherein the outer and inner walls have edges adjacent the mouth of the chute, the edge of the outer wall forming a tearing edge, the opening in the outer wall being spaced from the edge, the opening in the inner wall being a notch extending from the edge to register with the outer-wall opening, the outer-wall opening and the notch providing finger access for grasping the end of the paper, the notch being adapted to permit finger contact with the paper for initial withdrawal past the tearing edge, the projection of the edge of the inner wall being less pronounced adjacent the notch to facilitate the initial withdrawal of the paper.

13. A paper dispenser, comprising in combination, a container adapted to receive a roll of paper, a pair of substantially parallel outer and inner walls forming a dispensing chute leading from the container, the walls having edges adjacent the mouth of the chute, the edge of the outer wall forming a tearing edge, an opening in the outer wall spaced from the tearing edge, a notch in the inner wall extending from the edge thereof and registering with the opening, the opening and the notch providing finger access for grasping and drawing the end of the paper past the tearing edge, the notch providing finger access to the rear side of the paper when access to the front side is interrupted by the tearing edge, the inner wall projecting forwardly and overlapping the tearing edge to guide the paper adjacent the latter, the projection of the inner wall being less pronounced adjacent the notch to facilitate the initial withdrawal of the paper.

14. A paper dispenser, comprising in combination, a container adapted to receive a roll of paper, a pair of substantially parallel outer and inner walls forming a dispensing chute leading from the container, the walls having edges adjacent the mouth of the chute, the edge of the outer wall forming a tearing edge, an opening in the outer wall spaced from the tearing edge, a notch in the inner wall extending from the edge thereof and registering with the opening, the opening and the notch providing finger access for grasping and drawing the end of the paper past the tearing edge, the notch providing finger access to the rear side of the paper when access to the front side is interrupted by the tearing edge, the inner wall projecting forwardly and overlapping the tearing edge to guide the paper adjacent the latter, the projection of the inner wall being less pronounced adjacent the notch to facilitate the initial withdrawal of the paper, the tearing edge terminating at each end in a point adapted to make an initial incision in the paper.

15. A paper dispenser comprising in combination a container adapted to receive a roll of paper, a pair of substantially parallel outer and inner walls forming a dispensing chute leading from the container, registering finger openings in the walls for grasping the free end of the paper, the outer wall having adjacent the mouth of the chute a lip inbent toward the inner wall and forming a tearing edge, the inner wall having a guiding lip projecting forwardly to overlap the tearing edge so as to guide adjacent the tearing edge the end of the paper.

16. A paper dispenser comprising a container adapted to receive a roll of paper, a pair of substantially parallel outer and inner walls forming a dispensing chute leading from the container, registering finger openings in the wall for grasping the end of the paper, the outer wall having adjacent the mouth of the chute a lip inbent toward the inner wall, a tearing edge on said lip narrower than the mouth of the chute, the edge terminating at either end in a point adapted to make an initial incision in the paper, the inner wall having an edge overlapping the tearing edge to guide the paper adjacent the tearing edge.

17. A paper dispenser comprising a container adapted to receive a roll of paper, a pair of substantially parallel outer and inner walls forming a dispensing chute leading from the container, registering finger openings in the walls for grasping the end of the paper, the outer wall having adjacent the mouth of the chute a tearing edge, the inner wall having an edge projecting across the mouth of the chute to guide the paper adjacent the tearing edge.

18. In a paper dispenser, a panel, an unserrated tearing edge on said panel for tearing the paper, means for supporting a roll of paper, means overlapping said tearing edge for guiding the paper adjacent thereto, the corners of said panel adjacent said edge being notched to provide points for making an initial incision in the paper.

19. In a paper dispenser, the combination of means for supporting a roll of paper, a front panel for guiding the paper, positioning means for locating a portion of the paper substantially parallel to and in rear of the panel, the panel having a finger opening, a tearing lip on the panel, the lip including a straight edge against which the paper may be torn, the corners of the panel at the straight edge being notched to form sharp points adapted when the paper is drawn outwardly and upwardly to pierce the paper to start the tear.

T. R. DAYKIN.